(12) United States Patent
Oliver

(10) Patent No.: US 8,708,273 B2
(45) Date of Patent: Apr. 29, 2014

(54) THREE-WING, SIX TILT-PROPULSION UNIT, VTOL AIRCRAFT

(75) Inventor: Richard David Oliver, Bluffton, SC (US)

(73) Assignee: Oliver Vtol, LLC, Bluffton, SC (US)

( * ) Notice: Subject to any disclaimer, the term of this patent is extended or adjusted under 35 U.S.C. 154(b) by 190 days.

(21) Appl. No.: 13/168,624

(22) Filed: Jun. 24, 2011

(65) Prior Publication Data

US 2011/0303795 A1 Dec. 15, 2011

Related U.S. Application Data

(63) Continuation-in-part of application No. 12/900,790, filed on Oct. 8, 2010.

(60) Provisional application No. 61/278,612, filed on Oct. 9, 2009.

(51) Int. Cl.
*B64C 29/00* (2006.01)
*B64C 11/20* (2006.01)
*B64C 11/32* (2006.01)

(52) U.S. Cl.
USPC ............ 244/12.4; 244/17.25; 244/56; 244/66

(58) Field of Classification Search
USPC .......... 244/7 R, 7 C, 12.4, 12.5, 17.23, 17.25, 244/23 R, 23 B, 23 D, 65, 66; 416/131, 416/132 R, 141
See application file for complete search history.

(56) References Cited

U.S. PATENT DOCUMENTS

| | | | |
|---|---|---|---|
| 2,814,451 A | 11/1957 | Turner et al. | |
| 3,081,964 A | 3/1963 | Quenzler | |
| 3,106,369 A | 10/1963 | Borst | |
| 3,292,710 A * | 12/1966 | Grut | 416/153 |
| 3,298,633 A | 1/1967 | Dastoli et al. | |
| 3,312,426 A | 4/1967 | Fowler | |
| 3,484,174 A * | 12/1969 | McCoubrey | 416/132 R |
| 3,499,620 A | 3/1970 | Haberkorn et al. | |
| 3,606,210 A | 9/1971 | Busby | |
| 3,618,875 A | 11/1971 | Kappus | |
| 4,273,511 A * | 6/1981 | Mouille et al. | 416/134 A |
| 4,492,353 A | 1/1985 | Phillips | |
| 4,979,698 A | 12/1990 | Lederman | |
| 5,419,514 A | 5/1995 | Ducan | |
| 5,839,691 A | 11/1998 | Lariviere | |
| 6,155,784 A * | 12/2000 | Carter, Jr. | 416/134 A |

(Continued)

FOREIGN PATENT DOCUMENTS

| | | |
|---|---|---|
| GB | 588112 | 5/1947 |
| GB | 880590 | 10/1961 |

*Primary Examiner* — Joseph W Sanderson
(74) *Attorney, Agent, or Firm* — McKenna Long & Aldridge LLP

(57) ABSTRACT

A vertical takeoff and landing aircraft having a fuselage with, preferably, three wings and six synchronously tilt-able propulsion units, each one mounted above, below, or on each half of the aforementioned three wings. The propulsion units are oriented vertically for vertical flight and horizontally for forward flight. Each propulsion unit comprises a propeller having a plurality of blades, where the pitch angle associated with the distal end of each blade and the proximal end of each blade are independently adjustable. As such, each of the propellers can be adjusted to exhibit a first blade pitch angle distribution optimized for vertical flight and a second blade pitch angle distribution optimized for forward flight.

7 Claims, 6 Drawing Sheets

(56) References Cited

U.S. PATENT DOCUMENTS

| | | |
|---|---|---|
| 6,886,776 B2 | 5/2005 | Wagner et al. |
| 6,986,642 B2 * | 1/2006 | Carter .......................... 416/139 |
| 7,472,863 B2 | 1/2009 | Pak |
| 7,861,967 B2 | 1/2011 | Karem |
| 7,874,513 B1 | 1/2011 | Smith |
| 7,959,104 B2 | 6/2011 | Kuntz |
| 8,152,096 B2 | 4/2012 | Smith |
| 2003/0080242 A1 | 5/2003 | Kawai |
| 2003/0085319 A1 | 5/2003 | Wagner et al. |
| 2004/0056150 A1 | 3/2004 | Morgenstern |
| 2006/0016930 A1 | 1/2006 | Pak |
| 2008/0048065 A1 | 2/2008 | Kuntz |
| 2009/0191058 A1 * | 7/2009 | Miller .......................... 416/131 |
| 2011/0001001 A1 | 1/2011 | Bryant |
| 2011/0168835 A1 | 7/2011 | Oliver |
| 2011/0303795 A1 | 12/2011 | Oliver |
| 2011/0315809 A1 | 12/2011 | Oliver |

* cited by examiner

THREE-WING, SIX TILT-PROPULSION UNIT, VTOL AIRCRAFT

REFERENCE TO RELATED APPLICATIONS

This patent application is a Continuation-in-Part Application of U.S. application Ser. No. 12/900,790 filed on Oct. 8, 2010, which is Non-Provisional Application of U.S. Provisional Application No. 61/278,612 filed on Oct. 9, 2009; the disclosure of both prior applications are incorporated herein by reference in their entirety.

BACKGROUND OF THE INVENTION

1. Field of the Invention

The invention relates to the field of VTOL aircraft, and in particular, to an aircraft which is capable of sustained vertical flight following the loss of thrust from a propulsion unit. This means the continued safe flight following the failure of not only an engine but a gearbox or propeller/rotor.

2. Description of Related Art

The advantages of an aircraft taking off and landing without an airport are obvious. Fixed wing aircraft are restricted to operations from relatively few airports and many of these airports are not the intended final destination. In military applications, airbases are vulnerable to attack. The response time of forward positioning of a VTOL support vehicle is significantly reduced and the range requirements are also reduced. Flexible positioning is also valuable in air ambulance applications, where the total response and delivery time "the golden hour" is critical to the survival of the patient.

The pursuit of an aircraft which can take-off and land vertically which possesses the speed, range, and payload capacity of an airplane has continued since the invention of the helicopter.

Helicopter VTOL

The reason this search continues is that the helicopter is full of performance limitations and safety problems. The performance is limited due to its limited forward speed due to retreating blade stall. It also has a limited range due to its inefficiency compared to fixed wing aircraft. The limited range is further reduced by the utilization of light weight turbine engines, which do not reach any reasonable fuel efficiency until operating at high altitudes where helicopters do not normally operate. The helicopter must consume much of its power simply keeping itself in the air, and approximately 15% of the power is consumed by the tail anti-torque rotor just to keep the helicopter from spinning. The helicopter must also deal with high vibration levels. There are many safety related problems that engineers and pilots are fully aware of. These are, loss of tail rotor effectiveness (LTE), Ground Resonance, Mast bumping, Loss of control during negative G flight, Settling with power (VRS), Dynamic roll-over, anti-torque rotor failures, and in case of engine failure, autorotations requiring unusually quick response by the pilot to maintain rotor speed and the immediate requirement to select a landing site. So, the helicopter has been the mainstay solution to our vertical flight needs because we have not found a better solution, but the aviation industry has not stopped searching for better solutions.

Aircraft designers have been working on the concept of vertical takeoff and landing (VTOL) aircraft for many years. There are a number of different ways to combine vertical flight with the horizontal flight of a conventional airplane, but developing a practical, redundant, and fixed wing performance hybrid aircraft has proven to be a surprisingly difficult and elusive task.

The engineering challenge consists of achieving two main goals. The first is to accomplish redundant and controllable vertical flight in such a way that the very same mechanisms and equipment are required for forward flight. Any weight of exclusively vertical flight mechanisms is useless during forward flight and represents a reduction in available payload relative to a fixed wing aircraft capability. The second goal consists of achieving "power matching". This simply means a successful VTOL design should require the same power in vertical flight as forward flight. Any mismatch represents excess capacity which corresponds to excess weight in one mode of flight.

The present invention simultaneously achieves both goals.

Numerous approaches to VTOL aircraft have been explored over the years, of which the two Joint Strike Fighter concept demonstrators are only the latest. There have been tilt-rotors like the V-22 Osprey, tilt-props and tilt-wings, as well as deflected-slipstreams, deflected-thrust, thrust augmenters, and tail sitters. Many of these exotic designs have been tested at Edwards, and Air Force Flight Test Center pilots have often been called to fly some extremely unusual aircraft. In fact, there are so many attempted VTOL aircraft solutions to this problem that there simply is not enough room in this patent application to list them all and their related problems. Much can be learned by studying the history of these and other VTOL aircraft.

Bell Helicopter, Ryan, Hiller, GE, Lockheed, Curtis-Wright, LTV, and others, mainly funded by the U.S. government have developed and tested various VTOL prototypes, known as X (for experimental) planes for years. I have listed just a sampling of the more promising designs. Many crashed or failed continued support, a couple are with us today. Most were not able to achieve the two main VTOL goals explained earlier. Many are in the literature and our aerospace museums.

Ducted Prop/Fan VTOL

Configurations known as Ducted Fans, both two and four duct versions, have been built and tested. The Navy X-22 (Bell Model D2127), with the first flight Mar. $17^{th}$ 1966, had four 1,267 HP engines with 7 foot diameter propellers mounted within four large ducts placed at each end of a forward and rearward wing. This craft first flew in 1966 and crashed, on Aug. the $8^{th}$ 1966 due to a single propeller control failure. The last flight was 1988. The promise of higher static thrust efficiencies offered by ducted propellers or fans was offset by the additional weight and drag of the large ducts during cruise flight. This craft also had cross-linked driveshafts to all four propulsion units to provide redundancy in the event of engine failure. The weight of this complex system and the ducts consumed much of the payload capability. The second prototype aircraft is currently on display in the Niagara Aerospace Museum, New York. The problem of a failure of a gearbox, shaft, or propeller and VTOL operation with airplane speed, range, and payload was not solved by the ducted propeller or fan design.

The Army/Douglas/Doak VZ-4DA Tilt Ducted Prop research vehicle placed a ducted fan at each end of a single conventional wing. Again, the duct gave the added static thrust efficiency for vertical flight but the extra weight and additional drag was a problem. The design used cross coupled drive shafts which significantly increased weight. The problem of a failure of a gearbox, shaft, or propeller and VTOL operation with airplane speed, range, and payload was not solved by the ducted propeller or fan design.

Lift Fan VTOL

On Aug. 13, 1965, Maj. Robert L. Baldwin lifted an oddly humpbacked brown jet into the air and began the Air Force Flight Evaluation of the GE-Ryan XV-5A. General Electric had been researching a fan-in-wing concept for V/STOL aircraft, and late in 1961 it won an Army contract for a concept demonstrator. GE subcontracted the design and construction work to Ryan. The XV-5A that resulted was a small, fighter-like design: 44 feet long with a 30-foot wingspan.

A pair of J85-GE-5 turbojets mounted within the fuselage provided approximately 5,000 pounds of thrust in normal flight. When vertical thrust was needed, the pilot could actuate a diverter valve that directed some of the exhaust gases to a pair of fans, 5 feet in diameter, located in the inboard portion of each wing. The wing fans rotated in opposite directions and were covered by large hinged doors in conventional flight. Exhaust gas also powered a smaller fan in the nose that provided pitch control and a measure of additional lift. All three fans together provided 16,000 pounds of vertical thrust. A set of louvered vanes underneath each of the large wing fans could vector the thrust in any direction and provided yaw control. Much of the all important payload capability was consumed by the complex fan system. The transitional behavior was reported as quite "abrupt" preventing it from being adequate for "service pilots". The XV-5A crashed at Edwards Air Force Base killing test pilot Lou Everett. The problem of a failure of a fan and VTOL operation with airplane speed, payload, and range was not solved by this ducted fan design.

Tilt Wing VTOL

Configurations where the whole wing tilts (Tilt Wings) with engines and propellers attached have been built and tested. On Jan. 27, 1961 the Navy Bureau of Naval Weapons (Bu Weps) created the Tri-Service Assault Transport Program. The original outline had been drawn up as a replacement for the Sikorsky HR2S, with a payload of 10,000 pounds, operational radius of 250 miles, and cruising speed of 250-300 knots. This is roughly what the Marine Corp has needed for many years and has culminated in the requirements for the V22 Osprey twin Tilt Rotor aircraft. The Ling-Temco-Vought (LTV) of Grand Prairie Tex. XC-142(A) cargo airplane (actually known as the Vought-Ryan-Hiller XC-142, but when Vought became part of the LTV conglomerate the name was dropped) is the most notable tilt wing VTOL. The XC-142A first flew on Sep. 29, 1964, and on Jan. 11, 1965, it completed its first transitional flight. My father was a design engineer at LTV when I watched this plane as a teenager. I was there when it crashed in the marshes of the lake near our home killing three test pilots due to a tail rotor drive shaft failure. This aircraft had problems with cross-linked drive shaft vibrations. It also had problems with wing angles greater than about 35 degrees. The wake due to wing stall caused serious control problems and as it converted from forward flight, the increase in wing angle of attack yielded too much lift and the aircraft climbed. These behaviors and problems were judged unacceptable. This aircraft configuration did not solve the problems resulting from the failure of a gearbox, driveshaft or propeller.

The Vertol V-76 is an additional example of a Tilt Wing research aircraft. This aircraft configuration did not solve the failure of a gearbox, driveshaft or propeller problems.

Deflected Thrust VTOL

Bell constructed the X-14 as an open-cockpit, all-aluminum monoplane. It was powered by two Armstrong Siddeley Viper turbojet engines equipped with thrust deflectors sited at the aircraft's center of gravity. The engines are fixed in position; transition from vertical to horizontal flight is achieved with a system of movable vanes that control the direction of engine thrust. Top speed was 180 miles per hour with a service ceiling of 20,000 feet. The X-14 was designed using existing parts from two Beechcraft aircraft: wings, ailerons, and landing gear of a Beech Bonanza and the tail cone and empennage of a Beech T-34 (a military trainer variant of the Bonanza).

The X-14 first flew on 19 Feb. 1957 as a vertical takeoff, hover, then vertical landing. The first transition from hover to horizontal flight occurred on 24 May, 1958. In 1959, its Viper engines were replaced with General Electric J85 engines. That year the aircraft was also delivered to the NASA Ames Research Center as the X-14A. It served as a test aircraft with NASA until 1981. The X-14 project provided a great deal of data on Vertical Take Off and Landing aircraft. The X-14A was a successful research aircraft. The VTOL design did not produce a practical aircraft with meaningful payload and range.

Directed Jet Thrust VTOL

Configurations using the Directed Thrust of jet engines have been tested. A small single seat Bell VTOL experimental had small turbojet engines placed on each side of the fuselage underneath a high wing. The engines were tilt-able for conversion to forward flight. Reaction nozzles, using bleed air provided directional control during hovering. The problem of engine failure was not solved by this aircraft design.

The MBB VJ-101 Jet Lift vehicle consisted of an F104 aircraft with tilt-able turbojet engines placed at each end of its conventional wing. The problem of engine failure was not solved by this aircraft design.

The British developed the fore-runner to the Marine's AV-8 Harrier, which proved itself in the Falkland's Islands invasion. But, to be truly useful, this aircraft must make a short conventional takeoff to carry its all important payload, making this vehicle a STOVL, Short Takeoff and Vertical Landing Craft. True single engine VTOL solutions using directed jet thrust will seldom be efficient or inexpensive, certainly not safe.

The AV-8 Harrier uses an ejection seat as a solution for engine problems. This is a very narrow solution initially designed for forward air support of ground troops.

The problem of a failure of a propulsion unit is not solved by these designs. The tilt jet embodiment of the present invention solves the problems of previous tilt jet configurations.

Jet Thrust Augmentation

Lockheed set up a privately funded VTOL design that was approached in a different way, using augmented lift-jets (thrust augmentation). It mixed hot engine exhaust gas with cold air to increase engine thrust. Lockheed made and tested their Model 330 Hummingbird where the exhaust from the jet engine was directed through ducts or nozzles that were installed within the fuselage. Most of the fuselage space was occupied as the mixing chamber with cold air intake from the upper hatch. Lockheed proposed this study to U.S. Army and was awarded a contract for two prototypes, designated XV-4A in competition with Ryan XV-5A and Hawker XV-6A in 1961. The first conventional flight was on July 1962. Three months later, first hover was tested but the actual thrust augmentation was much less than expected. The first XV-4A crashed in 1964. The second XV-4A then was modified as XV-4B for flight research by USAF until it crashed in 1969. The problem of engine failure and useful payload was not solved by this aircraft design.

Tail Sitter VTOL

In this configuration the aircraft literally sits vertically on its tail. This is accomplished by having three or four tail surfaces with small wheels attached at their ends. The aircraft normally has a counter rotating propeller located on the nose. The pilot must climb up a platform to enter the cockpit. These versions were built and flown but all test pilots had serious visibility problems when attempting landings. They were intended for maritime service aboard ships with heaving decks! They actually accomplished the goal of vertical and horizontal flight using the same equipment and power but were not capable of carrying any real payload other than the pilot and fuel. Their propeller disk loadings were simply too great for any meaningful payload and the landing challenge was completely unacceptable for any manned service.

Tilt Rotor/Prop VTOL

Designs using Tilted Propellers (Tilt-Props) are not new, the Tri-Service/Curtiss-Wright X-19 Tandem Wing Radial Force Tilt Prop aircraft placed Tilt Props at each end of two wings, creating a two wing four Tilt-Prop design. This aircraft used a cross-coupled drive shaft system to provide for an engine failure. The problem of a failure of a gearbox, shaft, or propeller is not solved by this design.

In October of 1953, Bell Helicopter was awarded a development contract to produce two aircraft for testing purposes. The Bell Helicopter XV-3 (originally known as the XH-33, classifying it as a helicopter) (Bell model 200) (the designation was changed in 1962 to XV-3A) first flew Aug. 11, 1955, achieved full conversion in 1958, was developed to explore the convertiplane concept and eventually successfully demonstrated the Tilt Rotor concept. These aircraft are referred to as Tilt Rotors, referring to the propellers as rotors, because they are mainly helicopter rotors with similar control heads. This vehicle consisted of two tiltable helicopter like rotors placed at each end of a wing, driven by a single engine. The prototype encountered significant vibrations during the transition to forward flight. These vibrations were eventually reduced. The data and experience from the XV-3 program were key elements used to successfully develop the Bell XV-15. The problem of a failure of a gearbox, shaft, or propeller/rotor is not solved by this design.

The development of the XV-15 Tilt-rotor research aircraft was initiated in 1973 with joint Army/NASA funding as a "proof of concept", or "technology Demonstrator" program, with two aircraft being built by Bell Helicopter Textron (BHT) in 1977. Ship number 1 was given NASA number 702, and ship #2 was 703. Aircraft development, airworthiness testing, and the basic "proof of concept" testing were completed in September 1979.

The aircraft is powered by twin Lycoming T-53 turbo-shaft engines that are connected by a cross-shaft and drive three-bladed, 25 ft diameter metal rotors (the size extensively tested in a wind tunnel). The engines and main transmissions are located in wingtip nacelles to minimize the operational loads on the cross-shaft system and, with the rotors, tilt as a single unit. For takeoff, the prop-rotors and their engines are used in the straight-up position where the thrust is directed downward. The XV-15 then climbs vertically into the air like a helicopter. The problem of a failure of a gearbox, shaft, or rotor is not solved by this design.

The BA609, Bell-Agusta Tilt Rotor is the commercial offshoot of the Bell XV-15, the tilt rotor proof of concept vehicle built at the main Bell plant in Hurst Tex. and tested at the Arlington Tex. facility. The BA609 is still in development as of this writing and is not expected until about 2012. However, like the XV-15, this aircraft uses a cross-coupled drive shaft system in case of engine failure. Thus, the problem of a failure of a gearbox, shaft, or rotor is not solved by this design.

The Bell/Boeing V22 Osprey Tilt Rotor is the military offshoot of the Bell XV-15 tilt-rotor. It uses two 6,150 HP engines and cruises at about 241 kts. It was intended to lift 25 fully loaded combat troops and quickly carry them 500 miles to fight its way in and out of high threat landing zones. This vehicle represents a solution to Tilt Rotor flight, but has been quite costly in terms of development and unit cost. The loss of a V22 in Arizona during a simulated mission is suspected to be due to asymmetrical Vortex Ring State (VRS). This is when one rotor effectively loses lift and the aircraft rolls and plunges to the ground. The V22 utilizes cross coupled shafts, so that the failure of one engine allows the remaining engine to power the opposite rotor. This is complex, heavy and expensive. This may provide a solution for a single engine failure, but not a gearbox, bearing, rotor, or blade failure. This may be a reasonable risk to the military, compared to the lives it can save, but may prove problematic and too costly in the commercial market.

Twin Tilt Rotor Aircraft Problems

The current technology twin tilt rotor V22 Osprey's recent performance is used as the best example of twin tilt rotor problems. Still, examination of the V22 performance data makes it clear that this is not a VTOL aircraft, but instead a STOVL aircraft.

1. The failure of either propulsion unit to produce thrust, results in the loss of the aircraft and occupants. The cross coupled drive shaft system provides a marginal performance backup limited to engine failure, not gearbox or rotor failures. Moreover, the installed weight of the cross-coupled drive shaft system reduces the all-important payload weight. The loss of 50% of this aircraft's power results in its' inability to continue its' mission and in many circumstances requires immediate landing. The present invention solves this problem with its' fundamental distributed propulsion design, providing for continued flight following the complete loss of thrust by any propulsion unit, no matter what the cause.

2. Inability to use evasive maneuvering tactics to avoid hostile fire, similar to that found in high threat landing zones. Quick maneuvering has resulted in the cracking and breaking of rotor root components which may result in the loss of a blade, and therefore the aircraft. The 38 foot rotors are limited to about 10 degree flapping angles. Quick maneuvering can (and has) easily exceed this angle resulting in the failure of a rotor and the potential loss of the aircraft. This limited maneuverability might be acceptable for commercial operations, but not for the intended applications of the military. The V22 is intended for insertion and extraction missions during ground fire. The present invention solves this problem by using much smaller diameter rigid propellers as opposed to helicopter like rotors which allow the blades to flap and distribute the load to six propellers instead of two rotors. The propellers are smaller for the same disk loading, therefore they have a smaller moment of inertia. Propellers have been used successfully on aerobatic airplanes and WWII dog fighters without blade separation due to these high gyroscopic forces. For example, the V22 Osprey has two rotors totaling a disk area of 2,268 square feet. Each blade is roughly 19 feet long (including hub radius), the length of a blade in a six propeller system of the same area would be eleven feet. This represents a significant reduction in blade root forces due to high G maneuvers.

3. Limited center of gravity (c.g.) range. The V22 design is inherently a narrow C.G. aircraft. The side by side location of the rotors does nothing to improve longitudinal c.g. range and the V22 has the highly limited c.g. range of a helicopter with a single rotor. It was intended that soldiers "down rope" from the left and right side of the V22, but the rotor wash blew them off the ropes due to the hurricane like wind below the rotors. A single rope was attached below the tail above the rear ramp area avoiding the rotor wash. This limited C.G. range prevents soldiers from moving to the rear ramp during "down roping" insertions, until the previous two have released the ropes' end at the ground. This significantly increases the time required to down rope 25 marines exposing the V22 to hostile ground fire for an unusually long period. If soldiers are excited and rush to the rear of this craft exceeding its aft C.G. limit, control will be lost along with the aircraft. The present invention solves this problem by distributing the thrust around the aircraft. The C.G. range is quite large and is therefore very tolerant of moving payload. In addition, the present motivation can accommodate simultaneous right and left down roping because the middle wing shields the soldiers from most propulsion unit down wash originating from the wing ends.

4. Settling with power or Vortex Ring State (VRS) is a well known (by engineers and pilots) problem with helicopters. It is a condition where an annulus or "donut" of accelerated air is created around the actuator (rotor) disk. Simply put, it's what happens when you try and fly in your own rotor wake. Roughly speaking, the air is turbulent and you begin to lose lift, if you raise the collective (increasing pitch) to correct the situation, it becomes worse. It is similar to running up the down escalator. The solution has been to reduce collective and push the cyclic forward to fly out of the disturbed air. An accepted method to avoid it is, as an example, is not to descend more than 300 fpm if you are flying less than 30 kts. When a helicopter gets in this situation, it can recover as long as it has enough altitude. Even tandem rotor helicopters can experience this behavior. The front rotor normally enters VRS first causing the front to drop, assisting in the necessary forward motion for recovery. The V22 configuration is different. When one of its rotors enters VRS, the aircraft begins to roll, the pilot instinctively corrects with opposite stick, worsening the problem and the ship rolls over and plunges toward the ground. This is what possibly happened near Tucson, Ariz. on a simulated night mission killing many Marines. The present invention solves the VRS susceptibility problem for Tilt Propeller configurations by distributing the load among six propellers. When a propeller enters VRS the present invention should remain stable and controllable.

SUMMARY OF THE INVENTION

In accordance with one aspect of the present invention, there is disclosed a vertical takeoff and landing aircraft comprising a fuselage, a plurality of wings attached to the fuselage, a first rotatable propulsion unit attached to a first side of each of the plurality of wings and a second rotatable propulsion unit attached to a second side of each of the plurality of wings. Each rotatable propulsion unit comprises a propeller and a propeller hub. Moreover, each propeller comprises a plurality of blades, where each of the plurality of blades has a hole along its longitudinal axis. Each propeller also comprise a plurality of rotatable rods, where each of the plurality of rods extends into the hole of a corresponding one of the plurality of blades. The proximal end of each of the plurality of blades is enclosed in or adjacent to the propeller hub and rotatable around the corresponding one of the plurality of rotatable rods. The distal end of each of the plurality of rods is fixed to a distal end of the corresponding one of the plurality of blades.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1A:
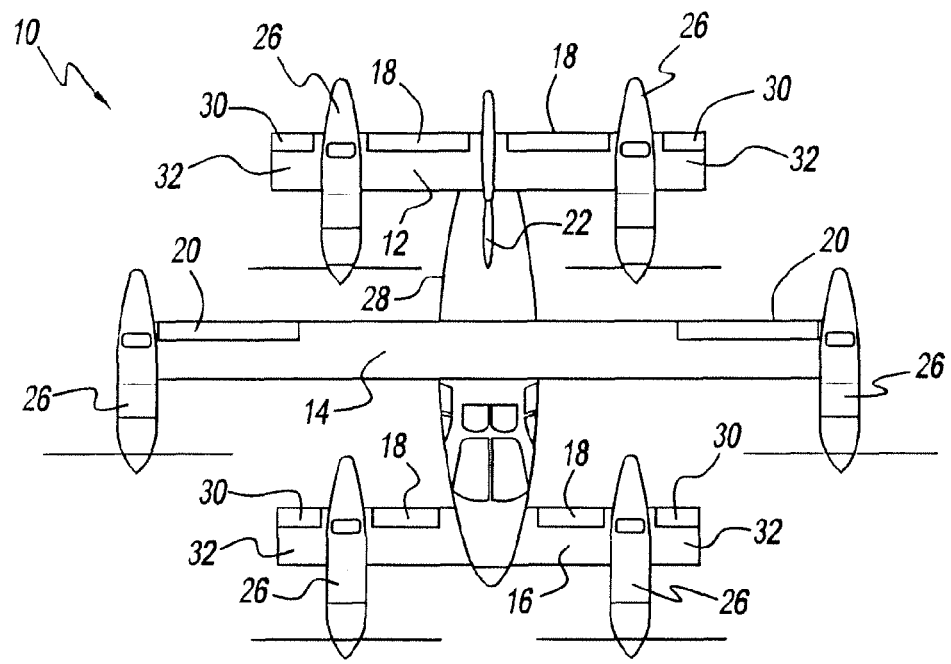
FIGS. 1a and 1b are top views of the aircraft with propulsion units in the horizontal and vertical positions.
Figure 1B:
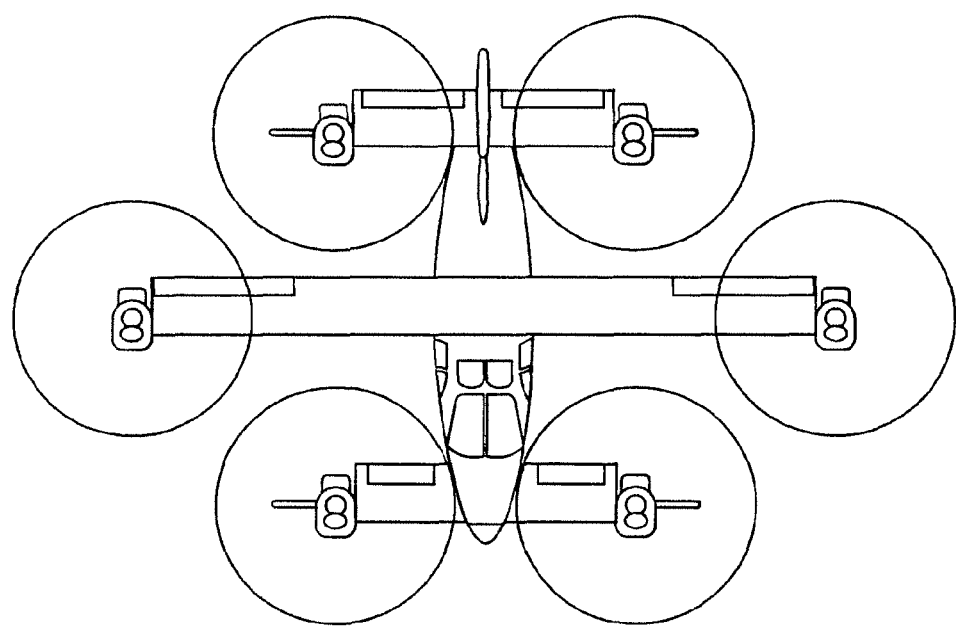

The invention is a vertical takeoff and landing aircraft. When the propulsion units consist of engine driven propellers, this VTOL configuration is known as a tilt-prop aircraft, since the propellers are tilted forward for forward flight and tilted vertically for vertical flight. When the propulsion units consist of engine driven rotors, this VTOL configuration is known as a tilt-rotor aircraft. When the propulsion units consist of engine driven fans, this VTOL configuration is known as a tilt-fan aircraft.

The term "Propulsion Unit" as used within this document refers to any method of producing thrust. The example of an engine driven propeller is chosen solely for illustration purposes and is not intended to limit the scope of this invention. The invention is valid for alternate means of propulsion including jet engines. When the propulsion units consist of jet engines this VTOL configuration is known as a "Tilt Jet" since the jets are tilted forward for forward flight and tilted vertically for vertical flight. The invention is valid for alternate propulsion unit tilting implementations. The engine (piston, turbine, rotary, electric or other power source) may be mounted on the wing and transfer power through a gearbox into its tilt-able propeller or rotor. This design allows the engine or motor to remain relatively fixed in a single position without having to operate in multiple positions of the propeller.

The aircraft configuration consists of a conventional aircraft fuselage, with a nose, with or without pilot and/or co-pilot crew stations in the case of Unmanned Aerial Vehicle (UAV) applications, a central cabin or payload area, and a tapering empennage. The aircraft has three wings, the front wing, middle wing, and the rear wing. Two propulsion units are mounted above, below, or on each of the three wings, yielding six propulsion units. The wings are fixed to the fuselage and the propulsion units rotate in unison to either of two (not including intermediate) positions, vertical or horizontal.

For electric motor, rotary, piston or turbine driven propeller or rotor embodiments, the propulsion units on opposite sides of the aircraft turn in opposite directions to cancel rotational moments about the yaw axis due to propeller or rotor torque. Small flapped wing panels are fixed outboard of the forward and rearward propulsion units. These wing panels are located within the propulsion units' propeller slipstream. They provide yaw control during vertical flight. Their flaps are disabled in the neutral position once the propulsion units advance toward the horizontal position.

The main landing wheels are located at the rear end of the forward propulsion units. A retractable and steerable tail wheel is located on the center line of the fuselage near the rear of the aircraft and retracts rearward and upwards into the normally unused space in the tail cone or alternatively for applications which require rear doors or a ramp the tail wheel may retract forward into the bottom of the fuselage. This eliminates the normally complex and heavy landing gear retraction and extension system increasing payload capacity. When the engines or motors rotate with the propellers or rotors the main wheels are mounted to the aft end of the forward propulsion unit engine support structures. This takes advantage of the existing structural load path which already exists for the engine support. When the engines or motors are mounted in a fixed position with the propellers or rotors tilting, the main wheels may be attached to the aft end of the tilting assembly. The propulsion units are spaced further apart than typical main gear designs increasing ground stability. Gear up landings are not possible with this invention as the landing gear is always down when the aircraft is in vertical flight mode. Separate landing gear controls and systems are not required. Proper placement of the main gear below the nacelle center line and clam shell gear doors can enable partial conventional takeoff and landings (CTOL) to enable additional payload capability when a runway is available. This is accomplished by placing the propulsion units in an intermediate position considering ground clearance is provided for the propeller, fan, or rotor tips. With jet propulsion units this would not be a problem.

For jet engine propulsion embodiments, yaw control is accomplished by exhaust deflection or bleed air supplied attitude control nozzles, methods instead of the yaw control wing panel required in the tilt propeller embodiment. The main landing gear consists of the same system described above except that the main wheels are not placed within the jet exhaust at the rear of the propulsion units but placed below the exhaust area.

The flapped front wing, sometimes called a canard, and rear flapped wing operate differentially providing pitch control. The aircraft contains a conventional vertical stabilizer and rudder assembly. The rudder provides conventional yaw control during forward flight. The middle wing contains conventional ailerons for roll control. When manned, the crew station(s) contain conventional helicopter controls, namely, a collective control used in vertical flight mode, a cyclic control for pitch and roll control, and rudder pedals for yaw control.

The forward wing is set at an effective angle of attack greater than the main and rear wing. This assures that this forward wing stalls first, dumping its load and causing a nose down pitching moment, for safety, restoring proper flight attitude, reducing the chance of the middle and rear wings stalling. Additional advantages of providing pitch control at the front and rear wing, as opposed to the single conventional rear elevator is the elimination of trim drag, the normal elevator down force and total elevator loss of control which can occur in deep stalls. Some aircraft have airfoils known as strakes, which are not required in this embodiment, mounted below their tails to provide a nose down pitching moment to prevent this from happening.

The rear wing may be mounted above the middle wing and the middle wing above the front wing. This arrangement reduces the exposure of each wing from flying in the downwash of the wing ahead of it, decreasing drag. The wing spans of each wing are chosen to provide the design wing span and position each set of propulsion units such that the thrust wake of forward units do not disturb the propulsion units that are mounted to their rear.

While in vertical flight, the six propulsion units are arranged around the aircraft producing thrust. Imagine a round table with six legs. Remove one leg and the table remains standing! The center of gravity of this aircraft is generally located about its' center. The propulsion units are placed such that the remaining thrust following the loss of thrust from one propulsion unit will maintain longitudinal and lateral static stability, therefore supporting the aircraft.

So, the weight, cost, and non-reliability of cross coupled engine drive shaft systems required in previous discussed designs is not required for continued flight following an engine failure in this invention. Each propulsion unit contributes only ⅙ of the total thrust. The twin tilt rotor V22 Osprey and BA609 engines must be sized such that one engine must supply the total power required for vertical flight. This means these engines need to be capable of greater than 200% of the normally required power. The additional reserve power required of these engines represents a lot of extra pounds and dollars. They must carry this extra weight of the engines and drive shafts all the time which reduces their payload capacity. The owner or operator must pay the initial cost, and the continuing maintenance, and overhaul costs associated with this excess capacity. Also notice that the failure of a gearbox, rotor system or blade and asymmetrical VRS will result in the total loss of these aircraft.

The present invention requires its' propulsion units to have reserve power, to replace the thrust from the failed propulsion unit, but far less than previously discussed configurations. Much of this reserve power is already required for normal de-rating for reliability, aging, additional power for control, and additional power for vertical climbing and vertical decelerations. So, this distributed power invention requires little additional capacity due to a failed propulsion unit.

This invention solves the critical problem of failed engines, gearboxes, propellers, or rotors resulting in the loss of the aircraft and occupants.

This invention solves the problem of limited maneuverability of twin tilt rotor designs.

This invention solves the problem of limited center of gravity range of single or twin tilt prop/rotor designs.

This invention overcomes the susceptibility to Vortex Ring State of helicopters and twin tilt prop/rotor designs.

This invention solves the problem of propulsion redundancy requiring extra capacity and weight.

This invention solves the problem of a propulsion unit failure necessitating the eminent requirement to land.

This invention solves the problem of truly redundant VTOL flight combined with the speed, payload, and range similar to fixed wing aircraft.

This invention significantly reduces the retractable tricycle landing gear installed weight and complexity resulting in significantly increased payload capacity.

Shown in FIGS. 1-4 are a top view, a side view, a front view of the aircraft and a Flight Control Thrust Vectoring Mechanism for a VTOL tilt-propulsion aircraft in accordance with the principles of the invention.

Large diameter tilt rotor propulsion units are best for relatively heavy lift and lower speed applications similar to the V22 Osprey due to their intrinsic lower disk loading, yielding higher lift efficiency and higher rotor drag during cruise. The large blade areas of these rotors, requires large power to drag them through the air at high speeds. Although these aircraft normally contain excess power allowing them to achieve high speed flight, the fuel consumed at these speeds significantly decreases range. The V22 Osprey is capable of flight at 300 kts, but recommended cruise is 241 kts.

Tilt propeller propulsion units are best for medium lift applications requiring relatively higher cruise speeds, similar to turboprop fixed wing aircraft, due to the propellers' lower weight and drag at higher cruise speeds. In contrast, tilt jet propulsion units are best for highest speed applications.

The choice between reciprocating engines and turbo-shaft engines, as the power source, is not so simple. Where cost and propulsive efficiency, for range, are important, reciprocating engines will be the best candidate. Where higher power, speed, and lighter weight become a driving factor, turbo-shaft engines will be the best candidate. The slightly lower reliability of modern reciprocating engines, relative to turbines, is no longer a factor in the present invention due to its redundancy. Small UAVs will use reciprocating engines. Other UAVs may use electric motors. When the UAV must carry ordinance or significant payload such as sensor weights exceeding 500 pounds, turbo-shaft engines may be indicated. Commercial market air ambulances will use turbo-shaft engines. The main variations of the invention involve this choice of engine size and propulsion technology. The choice is determined by a simple trade study considering the intended application and the available engines. As long as the embodiment of the present invention provides for the static stability of the aircraft following the loss of the thrust of a single propulsion unit, and the thrust wake from each propulsion unit does not materially affect the performance of propulsion units to its rear, and the center of gravity range of the aircraft design remains within a polygon described by the interconnection of lines between thrust producing propulsion units, then the inventions' requirements are materially met.

Figure 2A:
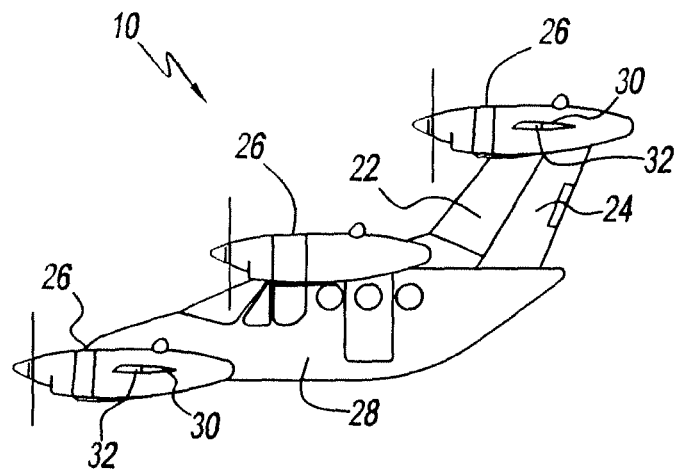
FIGS. 2a and 2b are side views of the aircraft with propulsion units in the horizontal and vertical positions.
Figure 2B:
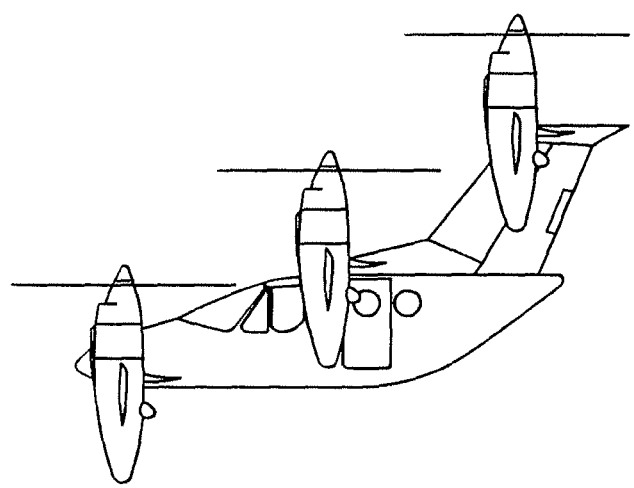
Figure 3A:
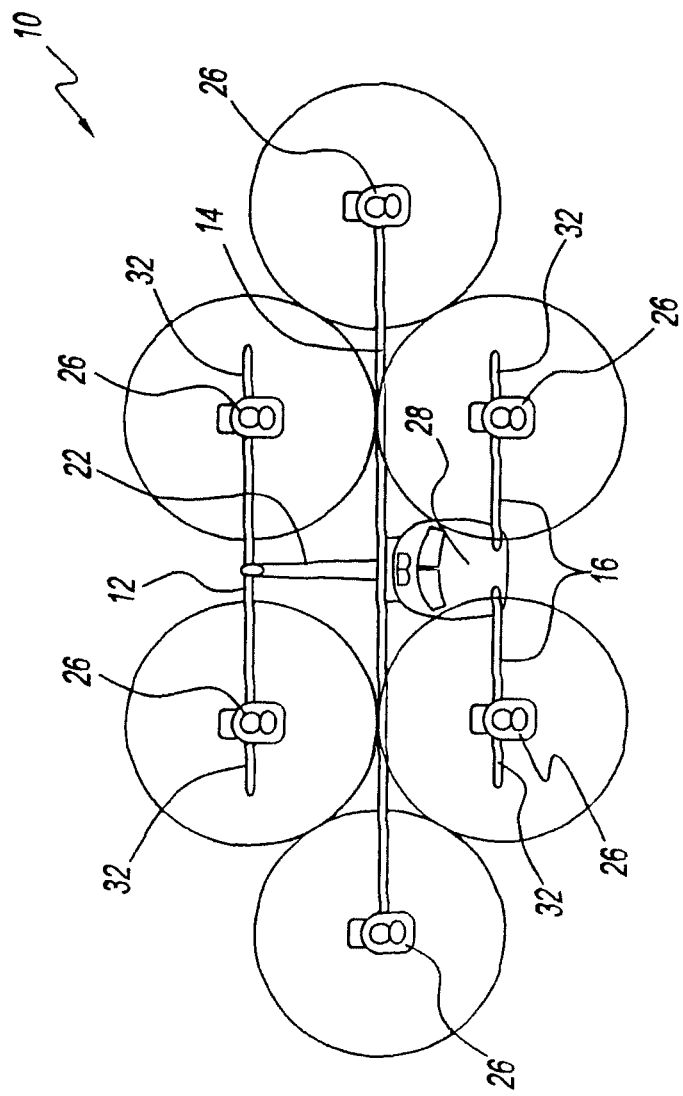
FIGS. 3a and 3b are front views of the aircraft with propulsion units in the horizontal and vertical positions.
Figure 3B:
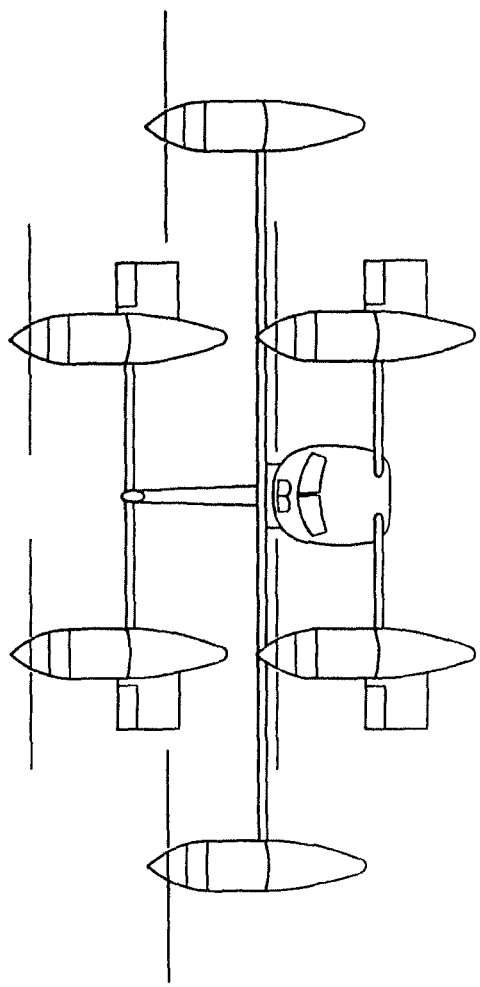

Referring to FIGS. 1-3, there is shown an aircraft 10 with six propulsion units 26 which can be in the vertical position for take off and landing and in the horizontal position for forward flight in accordance with the principles of the invention. The tilt-prop aircraft here disclosed, while not limited to any specific application, is intended to satisfy the medium weight and medium speed requirement.

The aircraft has three wings. The rear wing 12 is mounted above the middle wing 14 which is mounted above the front wing 16. The front wing 16 and rear wing 12 have differentially connected flaps 18 which provide the conventional forward flight pitch control. The front wing 16 is set at a higher effective angle of attack which assures stall prior to the middle wing 14 and rear wing 12.

The middle wing 14 contains conventional ailerons 20 for roll control in forward flight. The middle wing may extend beyond the propulsion units when a higher aspect ratio wing is required.

The aircraft has a conventional vertical stabilizer 22 and rudder assembly 24.

Located on each wing half is a propulsion unit 26 where the propulsion units of the aircraft of the FIGS. 1a through 3a are horizontally oriented and the propulsion units of the aircraft of FIGS. 1b through 3b are vertically oriented.

Located outboard of the front and rear propulsion units 26 are yaw control panels 32 with flaps 30. They are fixed to the propulsion units and rotate with them providing yaw control during vertical flight.

The rear wing 12 with propulsion units 26 may be mounted at the top of the vertical stabilizer 22 as a traditional T-tail arrangement, mounted in the middle as a traditional cruciform arrangement, or at the bottom. Mounting the rear wing 12 at the bottom of the vertical stabilizer 22 may require a jog in the empennage, similar to the V22 empennage, to maintain the rear wing 12 mounting position above the middle wing 14. Alternatively, the middle wing 14 may be located in the middle of the fuselage 28, allowing the rear wing 12 to be mounted on the upper surface at the base of the vertical stabilizer 22. This places the middle wing 14 spar in the cabin and may require an undesirable heavy ring carry through structure to prevent this. A UAV may use this method without the ring structure. Asymmetric thrust may be used for forward flight yaw control as long as the vertical stabilizer is sized for static lateral axis stability.

Analysis by the applicant of the invention has produced these listed design goals:

1. The engines' power should be approximately 150% of the power required for the "Hover Out of Ground Effect" H.O.G.E. hover and temperature requirements. This will provide for reliability de-rating, reduction of thrust due to engine aging, requirements for control power, and heave power (vertical acceleration and deceleration). This reserve generally should power match that necessary for engine-out operations.

2. All unnecessary weight should be avoided. The weight growth factor for VTOL designs is quite large.

3. Lightweight engines should be specified. Traditional horizontally opposed piston Lycoming or Continental engines may not be acceptable. Their horsepower to weight ratios of 1 to 2 are not appropriate for VTOL Tilt-Prop applications.

4. Complex and weighty propeller systems are not appropriate. Select light weight composite designs.

5. Normal utility load factors are acceptable.

6. Retractable landing gear, either tired tricycle or retractable landing skids are indicted for the highest speed requirements. Well faired fixed gear is appropriate up to about 200 kts. The gear should be designed for taxi capability and VTOL operations only. The disclosed method of placing the main wheels at the aft end of the forward propulsion units will provide the lowest cost and greatest payload.

7. Propeller power factors greater than 6 pounds thrust per horsepower should be sought.

8. Propeller disk loading of about 15 pounds per square foot or less should be sought.

9. Consider light weight propellers with novel blade twist technologies. These offer blade angle distributions favorable to both hover and cruise efficiency requirements.

10. Blade tip speeds during hover should be about 800 fps. Tip speeds during cruise should not exceed 0.8 Mach, except in tilt fan applications.

11. The propeller, gearbox, and engine combinations' static performance should be fully characterized and tested before the airframe detail design begins.

12. Power matching the cruise and hover requirement should be a design goal. When necessary, consider reducing the cruise speed requirement to meet this goal.

13. The rear wing should be mounted above the middle wing which should be mounted above the front wing to reduce drag due to downwash.

14. The front and rear wing should be flapped and differentially controlled to provide the conventional forward flight pitch control, and the front wing should be set at an effective angle of attack which assures stall prior to the middle and rear wings.

15. The middle wing should contain conventional ailerons for roll control in forward flight.

16. The aircraft should contain a conventional vertical stabilizer and rudder assembly. The rear wing with propulsion units may be mounted at the top as a traditional T-tail arrangement, mounted in the middle as a traditional cruciform arrangement, or at the bottom. Mounting the rear wing at the bottom of the vertical stabilizer may require a jog in the empennage, similar to the V22 empennage, to maintain the rear wing mounting position above the main middle wing. Alternatively, the main middle wing may be located in the middle of the fuselage, allowing the rear wing to be mounted on the upper surface at the base of the vertical stabilizer. This places the middle wing spar in the cabin or requires an undesirable heavy ring carry through structure. Asymmetric thrust may be used for yaw control as long as the vertical stabilizer is sized for static lateral axis stability.

17. The aircraft should have a highly reliable and simple thrust vectoring control mixer. The system should be analyzed carefully to eliminate single point failures causing total system failure. Failsafe thrust positions at the engines are necessary. Consider propulsion unit failsafe to some intermediate thrust by analyzing the hover power required at minimum useful load (single pilot and low fuel). Consider including anti jam links in the mixers' thrust command outputs.

18. The aircraft design team should take advantage of the six alternators and batteries located within the propulsion units, to obtain a fail proof electrical power source for the avionics systems. A minimum requirement is a left and right main electrical buss with a cross tie contactor. The busses should be located on opposite sides of the aircraft.

19. The fuel tanks should remain within the propulsion unit nacelles for safety. When additional fuel is required, each wing can have fuel bladders. A single point fueling system is heavy and brings the fuel into the fuselage. This should only be considered in UAV or military application where it might be mandatory. For commercial applications it is not abnormal for four or more tanks to require filling.

Control of the Aircraft During Forward Flight

The aircraft is controlled conventionally by helicopter type flight controls in forward flight. The collective flight control is not used during forward flight. Pitch and roll is controlled by the cyclic flight control which is differentially connected to the front and rear wing elevators for pitch control and middle wing ailerons for roll control. The rudder pedals provide yaw control and are connected to the vertical stabilizer rudder.

Control of the Aircraft in Vertical Flight

The control of motion about the pitch and roll axis is by way of thrust vectoring, which is accomplished by reducing the propulsion units' thrust in the direction you want the vehicle to move toward and increasing the propulsion units' thrust opposite this direction. This may be accomplished by a mechanical, electronic analog, digital or hybrid method, however, the following example is mechanical.

This is illustrated by controlling engine RPM, by way of throttling. Thrust may be controlled by differentially controlling propeller pitch, engine RPM or many other methods.

Figure 4:
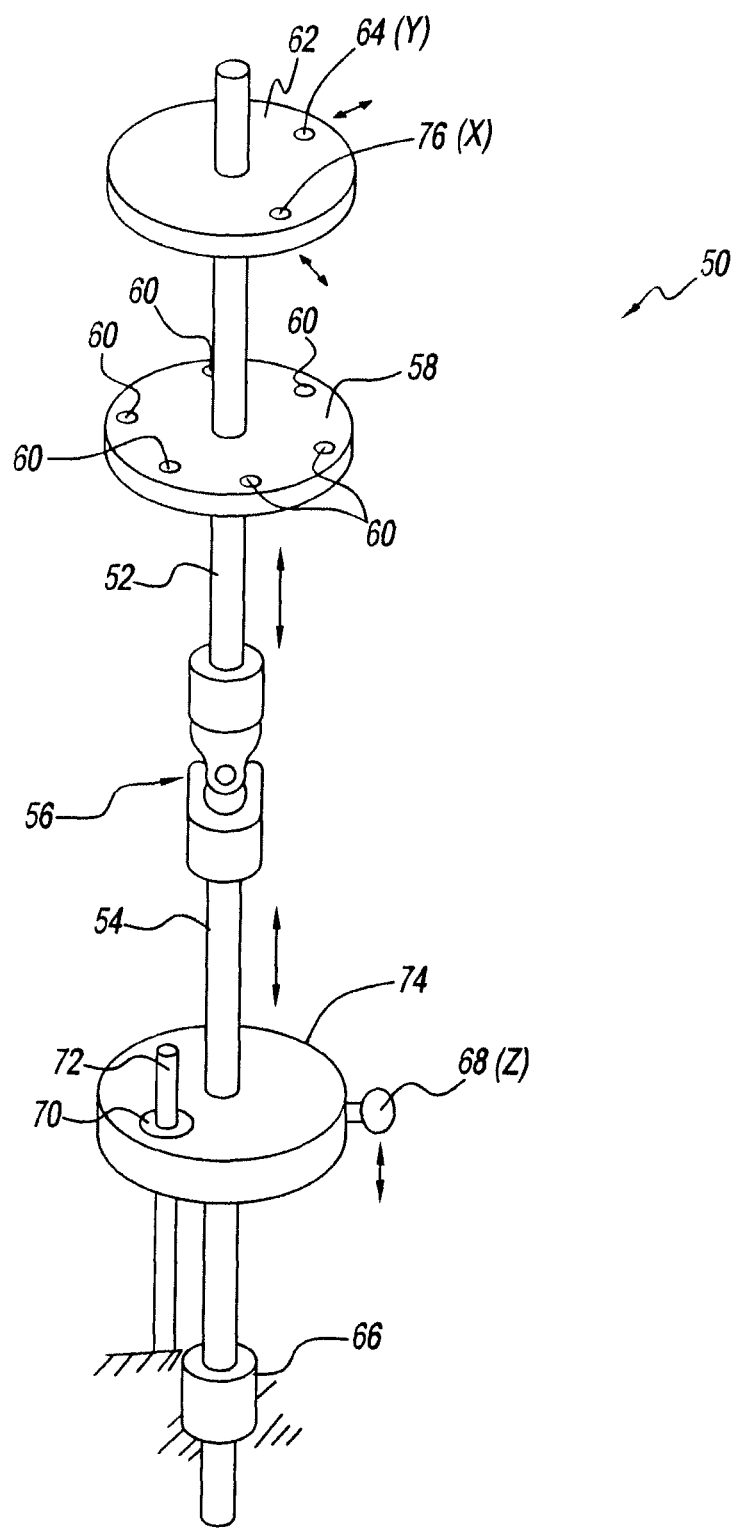
FIG. 4 is a Flight Control Thrust Vectoring Mechanism.

Referring to FIG. 4, there is shown a mechanism 50 which converts cyclic stick movement to thrust commands to six propulsion units. This mechanism is used to control the propulsion unit's thrust resulting in the pitch and roll of the vehicle in vertical flight. The mechanism is fundamentally a mechanical implementation of a rectangular (X, and Y) to polar (Displacement, and Angle) (Rho, Theta) coordinate converter, with the exception of an additional input, Z 68. This Z input 68 causes an equal change in six displacement outputs 60. Therefore, there are three linear inputs, X 76, Y 64, and Z 68 and six displacement outputs 60. Let the X input 76 be the pitch (fore or aft) position of the cyclic control, the Y input 64 be the roll (right or left) position of the cyclic control, and the Z input 68 be the position of the collective (up or down) control.

The mechanism 50 consists of a central two piece vertical rod assembly, consisting of two coaxially oriented rod pieces 52, 54, one above the other, with a universal joint 56 connected between them. The bottom vertical rod segment 54 is mounted in a fixed position linear bearing 66 near its bottom end, allowing vertical movement of the rod assembly which consists of 52, 54, 56, 58, 60, 62, 64, 68, 70, 74, and 76. A disk 74 is fixed on rod 54 above linear bearing 66 and below universal joint 56. Attached to the periphery of disk 74 is the Z axis input fitting 68. This is the Z axis, or collective input to the mechanism. When you raise or lower the collective control the rod assembly rises and falls in unison. Disk 74 contains a vertically oriented fixed linear bearing 70 with a small fixed vertical rod 72 passing through it. This prevents the rod assembly 52, 54, 56, 58, 60, 62, 64, 68, 70, 74, and 76 from rotating. A disk 58 is mounted on the upper rod 52 segment midway between the universal joint 56 and top end. There are six attachment points 60 around disk 58 which correspond to the relative angular locations of the propulsion units on the aircraft. These six attachment points 60 are the six thrust command outputs of the mechanism. A similar disk 62 is attached to the top of the upper rod segment. This disk has two orthogonally oriented attachment points 64 and 76 on the disk. These are the X 76 or pitch, and Y 64 or roll inputs. The cyclic control is connected to these two inputs, X 76 or pitch, and Y 64 or roll, and the top of the vertical rod 52 mimics the cyclic control position.

In operation, moving the cyclic flight control toward the right front direction, say 45 degrees to the right, causes the disk 62 at the top of the mechanism 50 to move forward and to the right since the disk 62 is connected to the cyclic control by way of the Pitch "X" 76 and Roll "Y" 64 inputs. The centrally located thrust command disk 58 mounted above the universal joint 56 moves with the rod 52 in the same direction, 45 degrees to the right. The thrust command attachment points 60 also move because they are part of the disk. Assuming the use of propeller pitch control cables, the thrust outputs 60 from the disk 58 push (reducing pitch and therefore thrust) on the cables in the direction of the desired vehicle movement and pull (increasing pitch and therefore thrust) on thrust cables in the opposite direction in an amount proportional to their relative angular placements.

Raising the collective flight control causes the rod assembly 52, 54, 56, 58, 60, 62, 64, 68, 70, 74, and 76 to rise and therefore pulls on all thrust cables equally, increasing the propeller pitch and therefore thrust on all six propulsion units equally.

Yaw control is provided through rudder pedals, controlling the flapped outboard wing panels. The conventional rudder remains connected and moves with the rudder pedals during hovering flight. Roll and pitch control by thrust modulation remains active until the propulsion units are commanded to leave the vertical position. The front and rear wing pitch control flaps and middle wing ailerons remain connected to the cyclic flight control during hovering flight. The front, middle, and rear wing flaps may be placed in a down position to reduce the vertical drag on the wing caused by the high velocity propeller wakes. These flaps must return to normal forward flight operation prior to disabling thrust vectoring control.

Control During Transitional Flight

The aircraft is brought to a hover and systems are checked similar to helicopter procedures. Once final checks are complete and cleared, the aircraft is accelerated to a transition speed. At this speed, the Middle wing Ailerons, Rudder, Front and Rear Wing flaps are fully effective for aircraft control. A conversion switch is placed in the first forward position causing the propulsion units to move to an intermediate forward position. The aircraft will accelerate to a specified forward speed when the conversion switch is then placed in the second intermediate forward position which causes the propulsion units to rotate to the second intermediate position and the wing panel flaps providing the yaw control during hover to return to the neutral position. Once the aircraft accelerates to a new specified speed, the conversion switch is placed in the forward flight position, the propulsion units rotate to the forward flight position and the conversion process is complete. The propulsion units' angular rate from hover to forward flight position should be approximately 6 degrees per second.

Control Following the Loss of Propulsion Unit Thrust in Vertical Flight

When a propulsion unit failure occurs, thrust is lost causing a roll and/or pitching moment toward the failed unit. The pilot instinctively will move the cyclic control to correct this motion. This control movement increases thrust in the neighboring propulsion units and decreases thrust in the opposite propulsion units, restoring the aircraft to its original orientation. The only thing that will change, from the pilot's perspective, is the new cyclic position in his hand. The vehicle is designed such that the center of gravity always passes within a polygon described by the relative positions of the remaining thrust producing propulsion units.

Control Following Loss Of Propulsion Unit Thrust in Forward Flight

When a propulsion unit fails, during departure and following transition to forward flight, the pilot simply trims the rudder for the relatively small asymmetrical yaw caused by the failed propulsion unit. This yaw is not like an engine failure in a twin engine airplane, where you lose half your thrust and gain a large addition drag due to its wind-milling propeller. With this configuration you lose 16.6% of your thrust and gain the additional drag of the propeller. The critically important concept of minimum control speed (VMC) does not exist here. The vehicle will have accelerated beyond this speed before transition to forward flight begins. Therefore the size, weight and cost of a large vertical stabilizer and rudder normally required for multiengine aircraft are not required with this invention.

Additional Features of the Invention

Propeller Blade Twist Control

There is a problem with prior art propeller technology as applied to aircraft that are designed for both static thrust (i.e. hovering flight) and high speed forward flight. More specifically, prior art propeller technology does not effectively support such aircraft.

Traditional aircraft propellers contain blade angle distributions optimized for one forward speed. Accordingly, each blade station (i.e., each point along the length of a propeller blade) is fixed at a corresponding pitch angle to achieve a best lift to drag ratio for that one forward speed. The blade angle, though fixed at any given station along the length of the blade, progressively changes from a first predetermined blade angle adjacent the hub to a second predetermined blade angle at the distal tip of the blade. The problem is that this blade angle distribution typically involves the blade root chord approaching the axis of the shaft which the propeller is mounted on. While this is optimal for the one forward speed, is not optimal for static thrust. If applied to a static thrust producer, much of the blade root would be stalled. Hence, helicopter rotor blades are sometimes twisted, but at a fraction of the twist of propeller blades.

Figure 5:
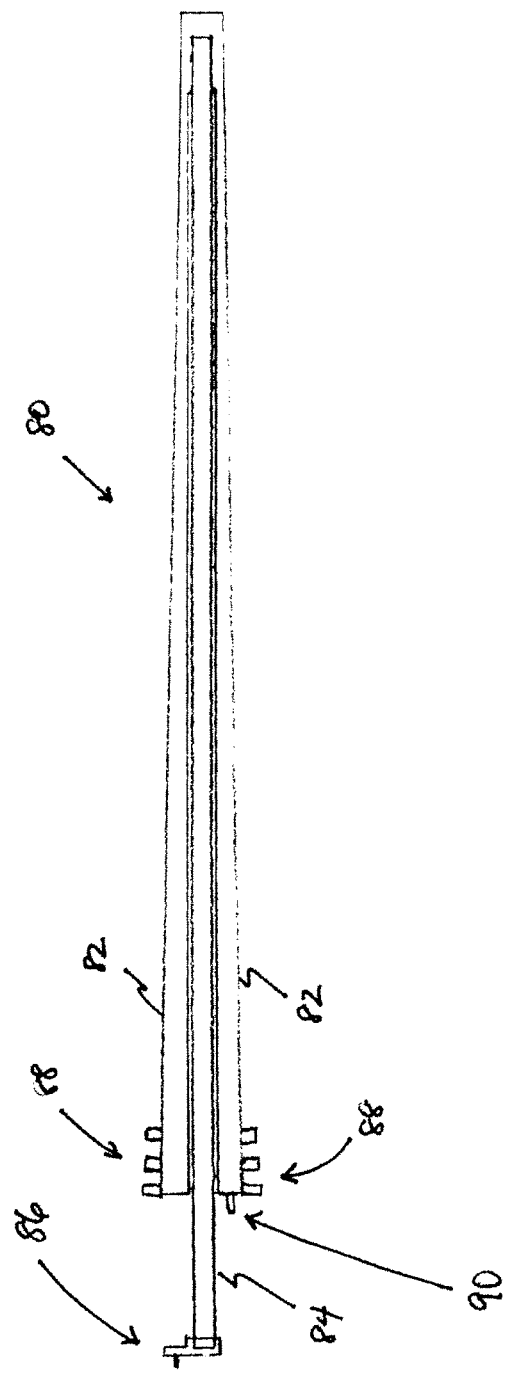
FIG. 5 is a cross-sectional view along the longitudinal axis of a propeller 80, in accordance with an exemplary embodiment of the present invention.

FIG. 5 is a cross-sectional view along the longitudinal axis of a propeller 80, in accordance with an exemplary embodiment of the present invention, which overcomes the aforementioned problems of the prior art propeller technology. As shown in FIG. 5, propeller 80 comprises a blade 82. In accordance with a preferred embodiment, blade 82 is made of composite material, such as carbon graphite, wherein the fibers are arranged such that blade 82 is flexible (i.e., twistable) about its longitudinal axis while resisting forces parallel to the propeller spinning axis. A rod or tube 84 (e.g., a steel rod) is placed in a long hole along the longitudinal axis of blade 82, as shown. The rod 84 may extend into the distal tip of blade 82, as shown, where it is anchored (fixed) to blade 82. In one exemplary embodiment, the distal tip of rod 84 is bonded to blade 84 at or near the distal tip of blade 84. The rod 84 may extend in the opposite direction into the propeller hub (not shown), where a cam 86 is attached to rod 84. A first actuator (not shown) may drive a first cam 86 which would apply a torsional force to rod 84, thus causing rod 84 to rotate. It will be understood that at least the distal tip of blade 82 would also rotate with rod 84 as the two are fixed to each other as explained.

Turning our attention back to blade 82, the root of blade 82 may be circular in cross section and comprise one or more blade retention structures 88. In accordance with preferred embodiment, the root of blade 82, including the blade retention structures 88 are, at least in part, mounted within an adjustable pitch blade retention mechanism. The adjustable pitch change mechanism would include a second actuator (not shown), such as a small electric motor mounted coaxially with the propeller. The second actuator may drive a second cam (not shown) that, in turn, may impart a force on a pin 90, positioned at the root of blade 82, as shown. The force acting on pin 90 would cause the root of blade 82 to twist around the rod 84. Yet, the angle associated with the distal tip of blade 82 angle may remain unchanged, as it is restrained by the fact that it is fixed to the rod 84.

The blade twist technique is similar to the technique associated with propellers produced by IVO props. In the IVO prop design, the blade root is fixed to the propeller hub and the torsion tube or rod is anchored to the blade tip. The twisting of the blade is accomplished by rotating the torsion tube or rod within the hub using a small cam, driven by a electric motor driven leadscrew. However, in the IVO design, the propeller blade angle at the hub is fixed and not adjustable, as in the present design. While the IVO design is not optimal for VTOL applications, the present design is optimal, because in the present design, the pitch angle associated with the distal tip of blade 82 is adjustable independent of the angle associated with the root of blade 82, and the root of blade 82 is adjustable independent of the angle associated with the distal tip of blade 82. Accordingly, the pitch angle distribution of blade 82 can be adjusted and, therefore, optimized to achieve effective static thrust and high speed forward flight.

Engine Size

The engine size of any version of this aircraft is significantly smaller than competitive configurations. Smaller engines tend to be simpler to handle and maintain. The design of most aircraft is limited to existing engine designs. It is rare that a new power plant is designed and manufactured for a new aircraft. An aircraft which utilizes relatively smaller engines has a much larger quantity to select from (smaller engines types are more numerous than high horse power engines). Smaller engines can be less expensive per horsepower than larger engines. The higher quantity of six engines allows more economies of scale to be realized. A manufacturer is far more interested if the aircraft utilizes six engines as opposed to one or two per vehicle. Quantity discounts are far more likely in this situation.

Safety Characteristics

Historically, when an aircraft suffers a failed engine, bad things can and do happen. Single engine aircraft lose an engine and land, sometimes, successfully, sometimes not. Multiple engine aircraft may continue the flight, sometimes not. Engine failure on departure with a twin engine fixed wing aircraft is notoriously dangerous. Single engine helicopters with a failed engine do not normally set down without damage or death following an autorotation. The pilot must be fast, proficient, and lucky.

The embodiment of this invention places six propulsion units in approximately equal angular distributions around the aircraft. This unique placement provides for the continued flight following a single propulsion unit failure. The aircraft center of gravity is designed to be located along the center line of the fuselage and approximately near the center of the middle wing spar. The propulsion units are designed to have reserve power in the event of an engine propulsion unit failure. So, inherent safety following a propulsion unit failure without any special pilot talent or proficiency is a unique characteristic of this invention.

Locating the fuel tanks within the propulsion units places the fuel away from the cabin occupants. Thus, fire in the cabin during flight or crash is unlikely.

Placing the propulsion units away from the cabin prevents them from entering the cabin during a normal crash scenario.

The forward wing stall behavior reduces the likelihood of the middle or rear wing stalling, reducing stall related accidents.

Locating the main wheels at the aft end of the forward propulsion units widens the space between the traditional main gear, increasing ground lateral stability.

Individual propulsion unit fuel systems provide completely independent fuel systems, preventing failure of more than one unit due to a single problem. There are no fuel selectors or cross-feed controls planned, just fuel shutoff switches in the cockpit.

With the advent of Primary Flight Displays (PFDs) and Multifunction Displays (MFD) the availability of a highly reliable power source on the aircraft is mandatory. As a matter of fact the FAA demands it. Today the FAA considers alternators and batteries as power sources. This embodiment shown with six propulsion units has twelve (12) power sources. A properly designed electrical system can produce the fail safe power source for these and other important electronic systems including remote control and communication links for the UAV versions of this vehicle. The safety increase of having a virtually fail-proof power source is simply put, great.

Efficiencies

The rear wing of this configuration supports its share of the vehicle weight as opposed to conventional aircraft. Conventional aircraft normally use a less efficient un-cambered airfoil known as the horizontal stabilizer. The stabilizer operates with a downward force during normal flight. This force effectively adds additional weight reducing payload capability. It also creates drag due to this negative lift, known as "trim drag". The V22 Osprey uses a conventional horizontal stabilizer and elevator in its configuration. The supersonic Concord actually pumped fuel to a tank in its tail to reduce this trim drag.

The front wing is a cambered airfoil wing which operates as a lift producer and at the same time provides pitch control as a canard with elevator. So, rather than paying for the weight, trim drag, and negative lift of the horizontal stabilizer. The rear wing becomes part of the lift producing wing function as well as sharing pitch control with the front wing.

The location of the propulsion units near the wing ends can provide an end plate effect which reduces the normal magnitude of wing tip vortices and improving span efficiency factor, reducing induced drag and, therefore, increasing range.

A structural efficiency can be gained by distributing propulsion unit weight near the wing tips which reduces wing root bending loads and, therefore, wing weight.

The use of six propulsion units avoids the weight, complexity, and cost of a cross coupled engine drive shaft system.

Industrial Applicability

The invention is applicable to aircraft and in particular VTOL aircraft. While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A vertical takeoff and landing aircraft comprising:
    a fuselage;
    three wings attached to the fuselage;
    six synchronously rotatable, thrust producing propulsion units located at approximately equal angular positions about a yaw axis of the aircraft;
    wherein one propulsion unit is mounted above, below, or on each half of the three wings, and each propulsion unit is independent from the other propulsion units, and wherein each rotatable propulsion unit comprises a propeller and a propeller hub, and wherein each propeller comprises:
        a plurality of blades, wherein each of the plurality of blades comprises a hole along a longitudinal axis of each blade; and
        a plurality of rotatable rods, wherein each of the plurality of rods extends into the hole of a corresponding one of the plurality of blades, wherein a proximal end of each of the plurality of blades is enclosed in or adjacent to the propeller hub and rotatable around the corresponding one of the plurality of rotatable rods, and wherein a distal end of each of the plurality of rods is fixed to a distal end of the corresponding one of the plurality of blades.

2. The vertical takeoff and landing aircraft of claim 1, wherein each of the propulsion units further comprises:
    a first actuator in mechanical communication with each of the plurality of rods, the first actuator configured to impart a rotational force on each of the plurality of rods; and
    a second actuator in mechanical communication with each of the plurality of blades, the second actuator configured to impart a rotational force on the proximal end of each of the plurality of blades.

3. The vertical takeoff and landing aircraft of claim 2, wherein the first and second actuators are operationally independent of each other.

4. The vertical takeoff and landing aircraft of claim 3, wherein each of the rotatable propulsion units has a substantially vertical orientation for vertical flight and a substantially horizontal orientation for forward flight, and wherein the first and second actuators are configured to adjust each of the plurality of blades so that the blades exhibit a first pitch angle distribution optimized for vertical flight and a second pitch angle distribution optimized for forward flight.

5. The vertical takeoff and landing aircraft of claim 1, wherein the three wings include a front wing, a middle wing, and a rear wing, relative to the fuselage.

6. The vertical takeoff and landing aircraft of claim 1, wherein the proximal end of each of the plurality of blades comprises blade retention structures.

7. The vertical takeoff and landing aircraft of claim 1, wherein each of the plurality of blades comprises carbon fiber composite material.

* * * * *